United States Patent [19]
Martinitz

[11] Patent Number: 5,249,347
[45] Date of Patent: Oct. 5, 1993

[54] FACE MASK FOR SPORTS GEAR

[75] Inventor: Franz W. Martinitz, Orangeville, Canada

[73] Assignee: Canstar Sports Group Inc., Ville Mont-Royal, Canada

[21] Appl. No.: 828,172

[22] Filed: Jan. 30, 1992

[51] Int. Cl.⁵ .................. B23P 19/04; A42B 3/20
[52] U.S. Cl. ........................... 29/460; 2/9; 2/424; 228/231
[58] Field of Search .................. 2/9, 173, 206, 410, 2/424, 425; 29/460; 148/660, 663; 228/173.5, 231

[56] References Cited
U.S. PATENT DOCUMENTS

| | | | |
|---|---|---|---|
| 4,021,858 | 5/1977 | Neeld | 2/9 |
| 4,028,743 | 6/1977 | Christensen | 2/9 |
| 4,031,564 | 6/1977 | Wood | 2/9 |
| 4,774,729 | 10/1988 | Coates | 2/424 |
| 4,933,993 | 6/1990 | McClelland | 2/9 |
| 4,985,938 | 1/1991 | Snow | 2/424 |
| 5,129,108 | 7/1992 | Copeland | 2/9 |

FOREIGN PATENT DOCUMENTS

| | | | |
|---|---|---|---|
| 0009787 | 1/1983 | Japan | 228/231 |
| 0016497 | 4/1985 | Japan | 228/231 |

Primary Examiner—Clifford D. Crowder
Assistant Examiner—Diana L. Biefeld
Attorney, Agent, or Firm—R. Craig Armstrong

[57] ABSTRACT

A wire mesh face mask for hockey or other sports is manufactured from a steel having carbon content in the range of AISI grades C-1018 to C-1038, and preferably C-1022. The mask is made by forming a grid of generally horizontal wires overlaid by generally vertical wires, shaping the grid into a mask shape, welding the wires to each other where they intersect, heat treating and quenching the grid to increase hardness, dipping the grid to coat it with an epoxy coating. This combination of materials and processes permits the use of a thinner wire than has previously been possible in face masks.

3 Claims, 5 Drawing Sheets

FACE MASK FOR SPORTS GEAR

BACKGROUND OF THE INVENTION

1. Field of the Invention

This invention relates to sports equipment, and particularly to a wire mesh face mask intended particularly for use in conjunction with a hockey helmet, but also conceivably adaptable for use with headgear for other sports, including for example baseball and softball catchers' masks.

For convenience and clarity, reference will be made to hockey helmets throughout this description, but it should be clearly understood that this is not in any way intended to limit the scope of the invention to hockey helmets.

2. Description of the Prior Art

Wire mesh face masks are well known. A number of manufacturers have such masks on the market. The primary advantages of such masks are that they allow a free flow of air, while offering substantial protection against impact from projectiles such as hockey pucks, baseballs, softballs, etc..

However, in order to provide adequate protection against impact, it has hitherto been necessary to use wire of relatively large diameter, i.e. typically on the order of 0.130 to 0.144 inches in diameter, and in some cases more. Relatively low carbon steel such as AISI grade C-1008 or C-1010 is commonly used, so that good weld strength can be obtained.

There are several main disadvantages in using such large diameter wire. Firstly, more material is required than if a smaller diameter could be used, so the cost is greater. Secondly, the weight is greater than it would be if a smaller diameter could be used. Thirdly, the larger diameter wire obscures the player's vision more that it would with a smaller diameter wire.

To date, no manufacturer has been able to develop a commercially feasible mask using a smaller diameter wire and yet still be able to meet impact resistance standards specified by bodies such as the Canadian Standards Association and corresponding standards bodies in other countries.

SUMMARY OF THE INVENTION

It is an object of the invention to provide a wire mesh face mask which employs a smaller diameter wire than has hitherto been possible, while still meeting or exceeding the required impact resistance standards.

In the invention, a medium carbon content steel wire is used. The face mask is formed and the intersecting wires are welded at their intersections. The mask is then heat treated to increase hardness.

The medium carbon steel provides reasonable strength with acceptable welding characteristics, and the subsequent heat treatment increases the hardness and strength substantially. The result is a face mask with the strength equivalent to a high-carbon steel, but with the weldability of a lower carbon steel. This increased strength permits a smaller diameter wire to be used, the preferred embodiment of the face mask for a hockey helmet using a wire diameter of just 0.113 inches, for example.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
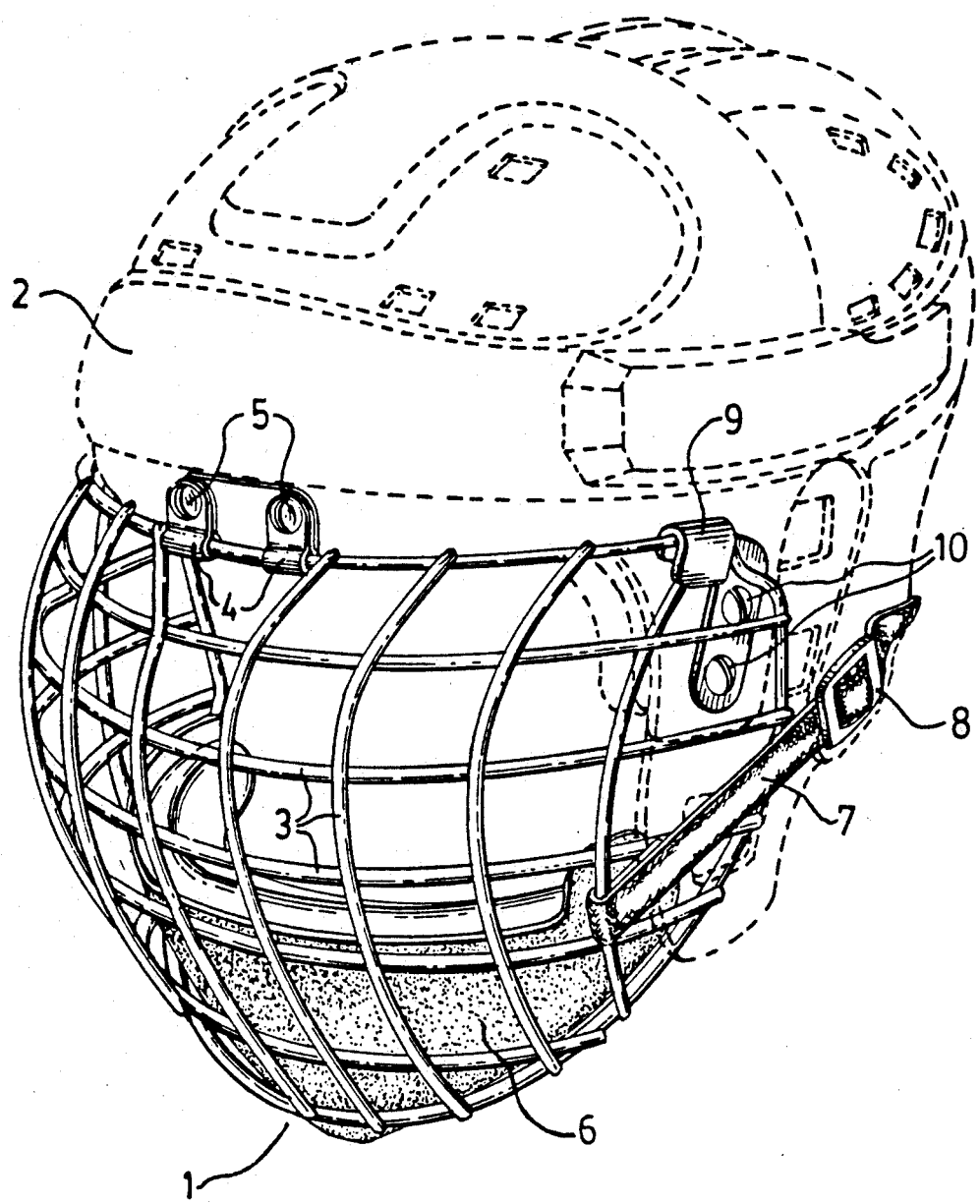
FIG. 1 is a perspective view showing the face mask installed on a hockey helmet.
Figure 2:
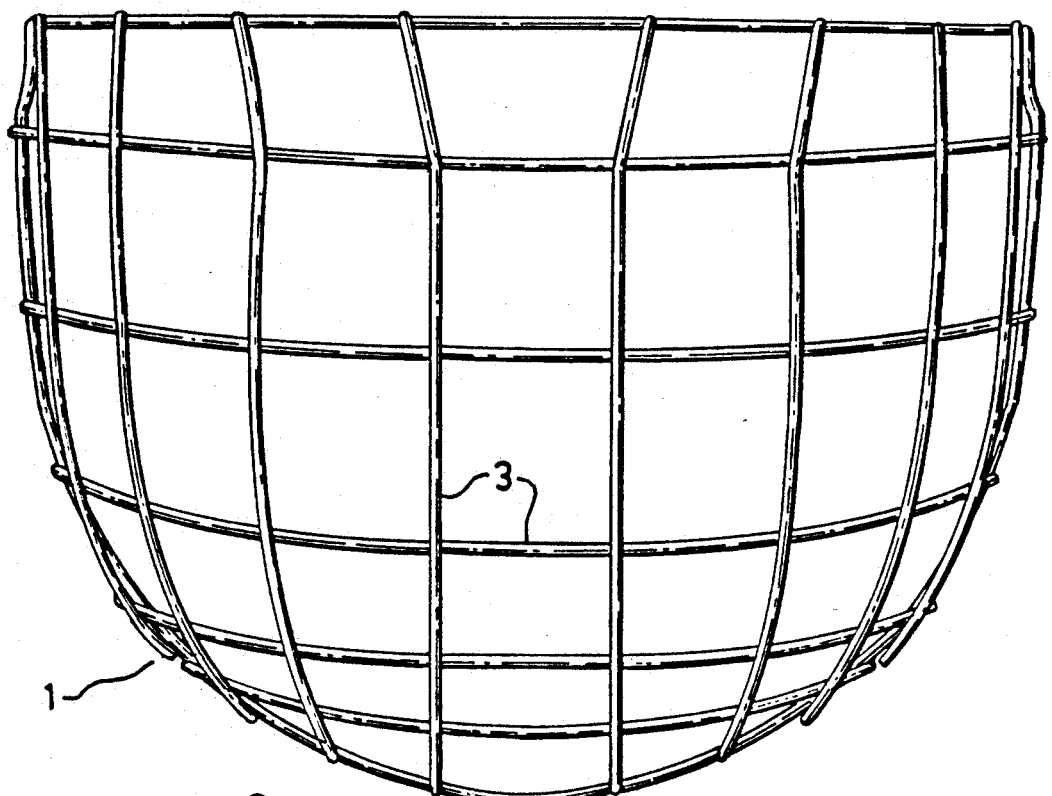
FIG. 2 is a front view of the face mask.
Figure 3:
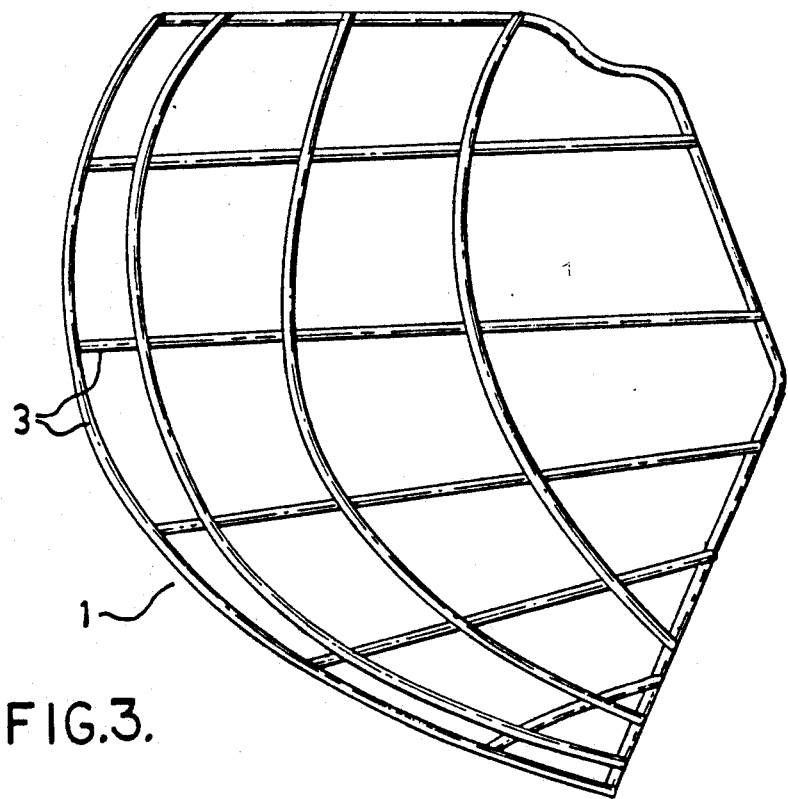
FIG. 3 is a side view of the face mask.
Figure 4:
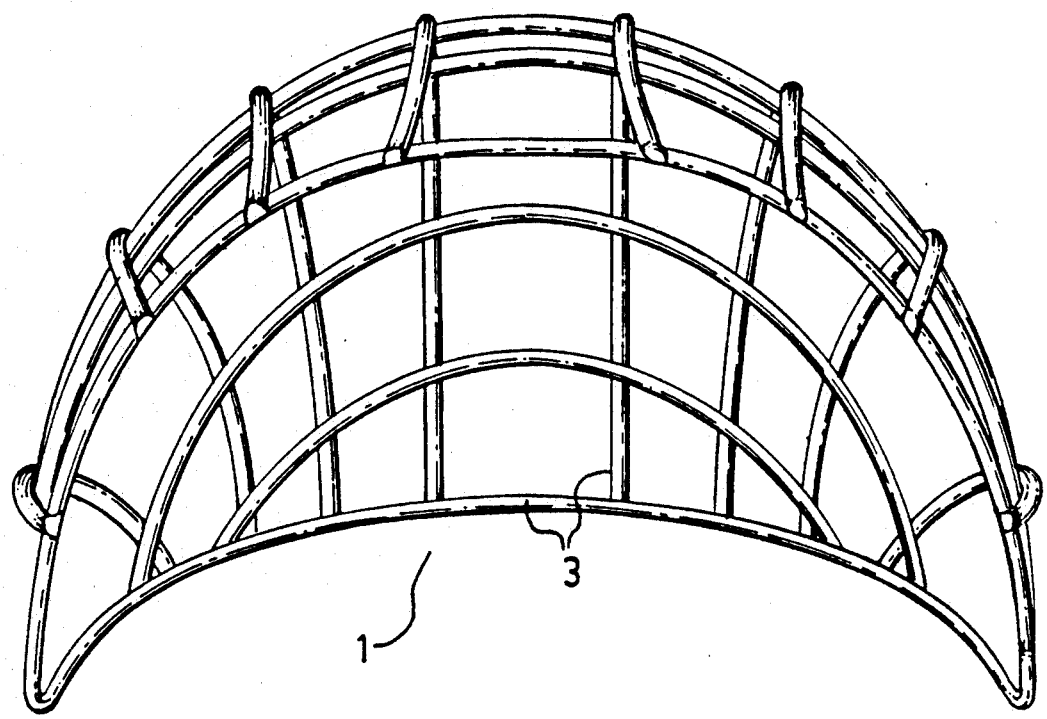
FIG. 4 is a top view of the face mask.
Figure 5:
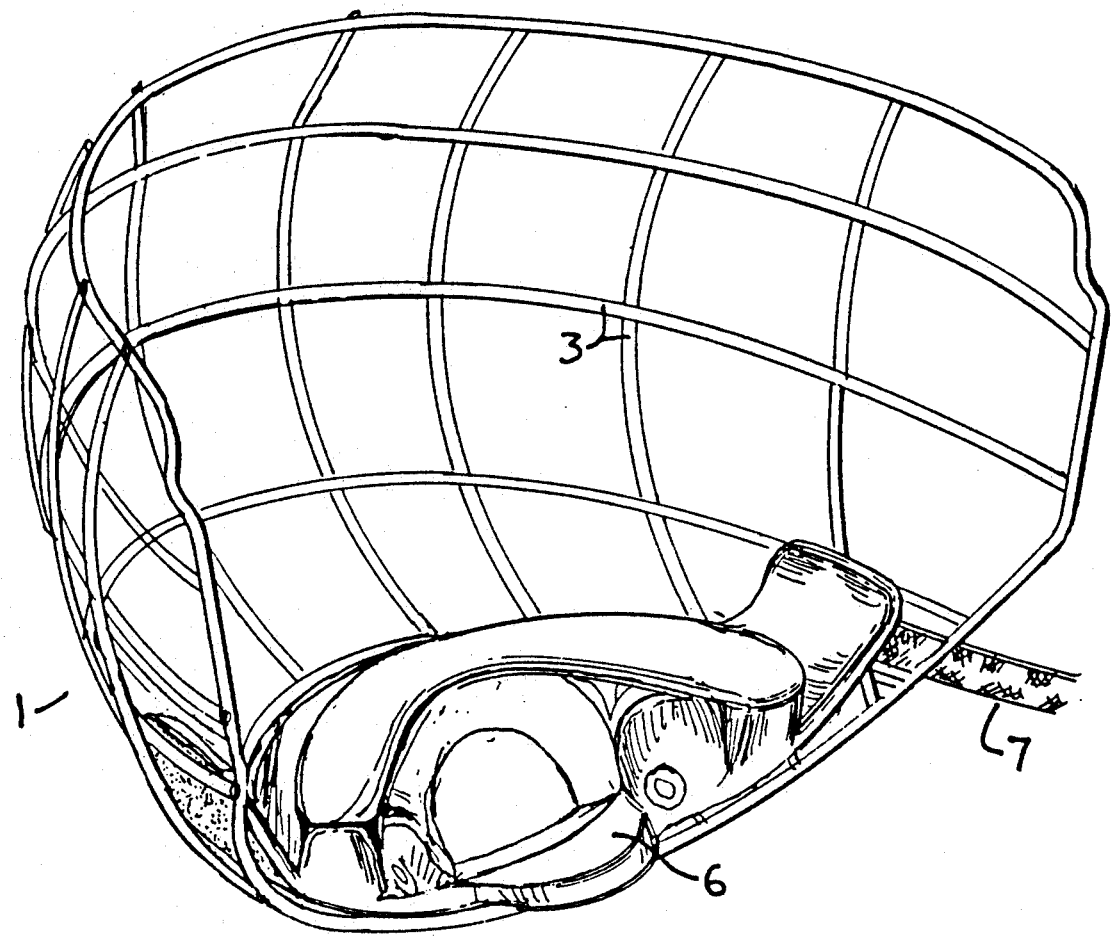
FIG. 5 is a perspective of the face mask from the inside, showing the typical chin strap arrangement.

FIG. 1 shows the preferred embodiment of the wire mesh face mask 1, installed on a hockey helmet 2. The face mask is formed from a number of wires 3, welded together wherever they intersect. The face mask is pivotally mounted onto the helmet by clips 4 which pass around the horizontal wire at the top of the mask and are secured to the helmet by screws 5. A chin guard 6 is typically mounted inside the lower portion of the mask, and is fastened to the helmet once the helmet is on the player's head by virtue of a strap 7 with dome fasteners 8 which snap onto the helmet. A bracket 9 mounted on the helmet by screws 10 acts as a stop for the mask. This arrangement ensures that the mask is properly positioned in front of the player's face.

Figure 6:
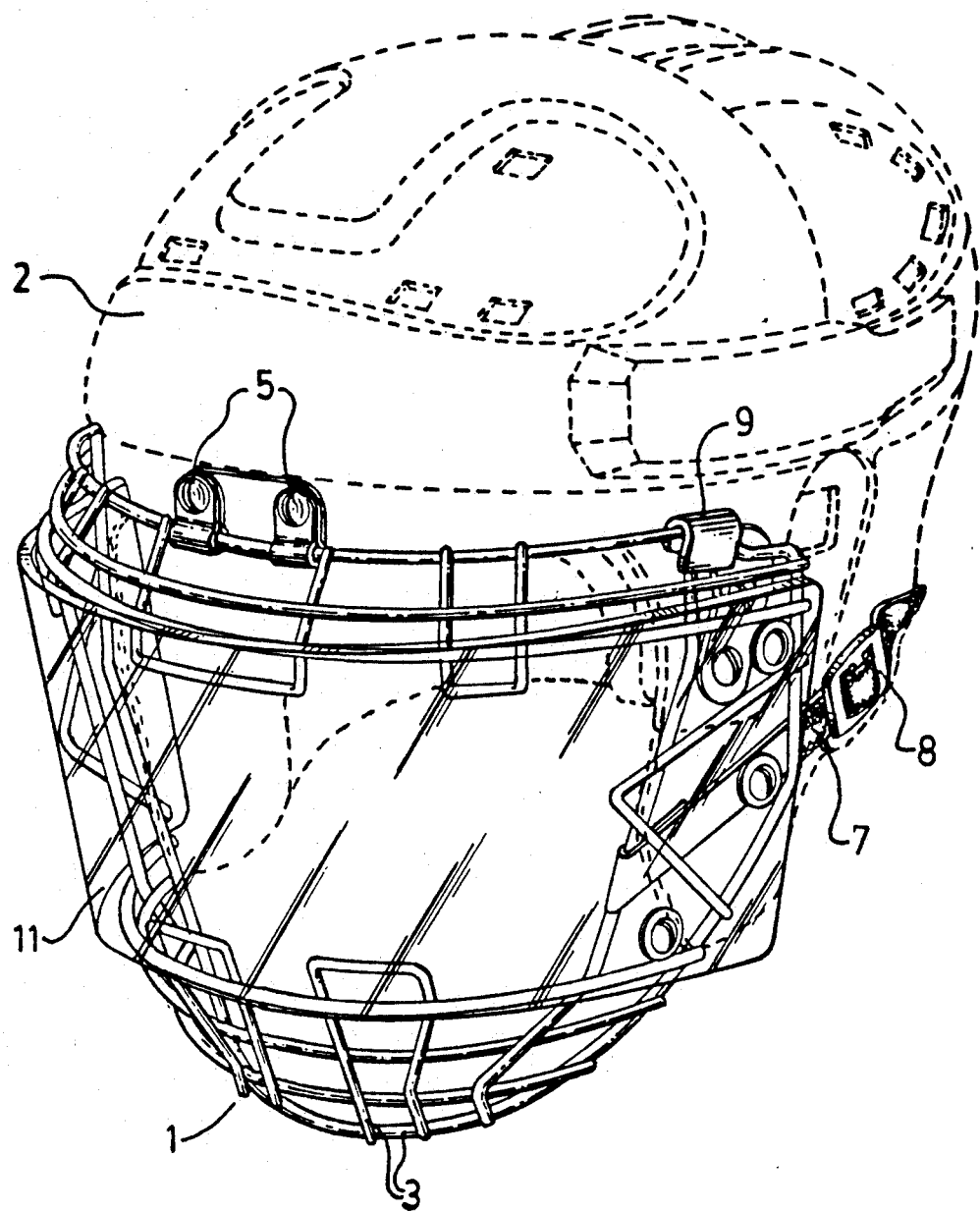
FIG. 6 is a perspective view showing an alternative embodiment of the face mask, incorporating a clear LEXAN (trademark) visor, installed on a hockey helmet.

In the alternative embodiment illustrated in FIG. 6, the mesh 1 has a large opening defined therein, which is covered by a clear LEXAN shield 11 mounted against the outside of the mesh. In hockey helmets, this arrangement is preferred by many players, since the LEXAN shield provides an unobstructed view of the incoming puck, albeit at the expense of decreased ventilation and possible concerns of fogging.

Neither of the above arrangements is unique to the present invention. What is unique is the wire which is used to form the masks, and the method of manufacturing which permits that wire to be used. As can be readily appreciated from the drawings, the spacing of the wires is such that a smaller diameter wire could greatly improve the visibility through the mask.

The face mask is manufactured by the following process. First of all, the generally vertical wires are laid into a grooved form, and the generally horizontal wires are then laid on top of them in the form. This forms the grid and the wires are bent to the desired shape. The wires are then welded together where they intersect.

The wire is a medium carbon steel. This provides a somewhat stronger wire than the low carbon steel, typically AISI grade C-1008 or C-1010, commonly used in the prior art. In the invention, C-1022 steel has been found to be most advantageous. A steel with a carbon content as low as perhaps C-1018 steel could be used, and then subjected to heat treatment to increase the hardness, but might not be as strong as in the present invention, so that a slightly larger diameter might be required to attain comparable strength. At the other extreme, a steel with a carbon content as high as perhaps C-1038 steel could be used, but the weldability of such a steel is not as good; the welds might not be as strong or as reliable due to crystallization at the welds. Also, the brittleness of the steel may become excessive, or at least beyond optimum. Within the stated range, it should be possible to produce masks which are superior to those in the prior art, but C-1022 steel appears to be the optimum. A narrower range around C-1022 steel, such as C-1020 to C-1030, would provide greater assurance of satisfactory performance than towards the extremes of the broader range.

Once the mask has been formed, it is then heat treated to bring the hardness to approximately the 32 to 38 range on the Rockwell C scale. The 1022 steel is normally hardenable to about the 45 to 50 range. However, in this case the material is mar-quenched in a mild quenching material such as oil or salt, after reaching an austenitizing temperature of 1650 degrees Fahrenheit. This produces a tempered martensite plus pearlite structure which minimizes any risk of cracking, and produces higher ductility to give the mask higher impact strength.

It is the heat treatment after welding which is the essence of the invention, since it permits a medium carbon steel to be used for good weldability, but permits the hardness and strength of a higher carbon steel to be obtained, thereby permitting the use of a smaller diameter wire.

After quenching, the mask is dipped to coat it with a polyester epoxy coating, and is then cured. This coating provides a slightly resilient coating which is not prone to cracking on impact or extremes of temperature.

In the case of a mask intended for use with hockey helmets, as shown in the drawings, the spacing between wires is approximately 1¼ to 1⅜ inches. At this spacing, the 0.113 inch diameter wire is sufficiently strong to exceed the present standards of the Canadian Standards Association, and the corresponding standards in other countries.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, as previously mentioned, it should be clear that the face mask could be adapted to use with sports headgear other than hockey helmets, such as catchers' masks for baseball and softball, for example. The mesh opening size and wire diameter could be readily adjusted to meet the required maximum opening size and the required impact resistance. The method of the invention will still permit a smaller wire diameter to be used than for a corresponding mask in the prior art.

It should also be clearly understood that the invention is not limited to the specific wire mesh configuration illustrated in the accompanying drawings. The method of manufacturing the face masks will be advantageous in any configuration of face mask using intersecting wires to define a mesh arrangement.

What is claimed as the invention is:

1. A method of manufacturing a face mask for sports gear, comprising the steps of:
    forming a grid of generally horizontal wires overlaid by generally vertical wires;
    then shaping said grid into a mask shape;
    then welding said wires to each other where they intersect;
    then heat treating and quenching said grid to increase hardness;
    then dipping said grid to coat it with an epoxy coating and allowing said coating to cure; where said wire is a steel with carbon content in the range of AISI grade C-1018 steel to C-1038 steel.

2. A method as recited in claim 1, where said wire is a steel with carbon content in the range of C-1020 steel to C-1030 steel.

3. A method as recited in claim 1, where said wire is C-1022 steel.

* * * * *